United States Patent
Tang et al.

(10) Patent No.: US 10,958,367 B2
(45) Date of Patent: Mar. 23, 2021

(54) NETWORK APPARATUS AND CLOCK SYNCHRONIZATION METHOD

(71) Applicant: UTStarcom Telecom Co., Ltd., Hangzhou (CN)

(72) Inventors: Yong-Lin Tang, Hangzhou (CN); Guang-Pu Zhou, Hangzhou (CN); Xiao-Mao Gan, Hangzhou (CN); Si-Hai Bao, Hangzhou (CN)

(73) Assignee: UTStarcom Telecom Co., Ltd., Hangzhou (CN)

( * ) Notice: Subject to any disclaimer, the term of this patent is extended or adjusted under 35 U.S.C. 154(b) by 0 days.

(21) Appl. No.: 16/685,912

(22) Filed: Nov. 15, 2019

(65) Prior Publication Data
US 2020/0162181 A1    May 21, 2020

(30) Foreign Application Priority Data
Nov. 20, 2018   (CN) .......................... 201811387374.8

(51) Int. Cl.
| | |
|---|---|
| *H04W 4/02* | (2018.01) |
| *H04J 3/06* | (2006.01) |
| *G06F 1/12* | (2006.01) |
| *G06F 1/14* | (2006.01) |

(52) U.S. Cl.
CPC .............. *H04J 3/0697* (2013.01); *G06F 1/12* (2013.01); *G06F 1/14* (2013.01); *H04W 4/023* (2013.01)

(58) Field of Classification Search
USPC .......................................... 375/354; 370/338
See application file for complete search history.

(56) References Cited

U.S. PATENT DOCUMENTS

| | | | |
|---|---|---|---|
| 9,060,342 B2 * | 6/2015 | Wu ...................... | H04W 64/00 |
| 10,205,547 B2 * | 2/2019 | Mizrahi ................ | H04J 3/0602 |

(Continued)

FOREIGN PATENT DOCUMENTS

| | | |
|---|---|---|
| CN | 108205147 A | 6/2018 |
| CN | 108333604 A | 7/2018 |

OTHER PUBLICATIONS

Notice of Grant issued in corresponding CN Application No. 201811387374.8 with English translation dated May 20, 2020 (7 pages).

(Continued)

*Primary Examiner* — Eva Y Puente
(74) *Attorney, Agent, or Firm* — Osha Bergman Watanabe & Burton LLP

(57) ABSTRACT

A network apparatus connected with a first clock source and at least one second clock source is provided. The network apparatus includes a system clock, a slave port connected to the first clock source, at least one passive port connected to the at least one second clock source, and a processor that controls synchronization of the system clock. The processor determines, from the slave port, a first clock offset between the system clock and a clock of the first clock source. The processor determines, from the at least one passive port, at least one second clock offset between the system clock and at least one clock of the at least one second clock source. The processor determines a true clock offset based on the first clock offset and the at least one second clock offset and synchronizes the system clock using the true clock offset.

16 Claims, 4 Drawing Sheets

(56) References Cited

U.S. PATENT DOCUMENTS

| | | | |
|---|---|---|---|
| 2002/0114303 A1* | 8/2002 | Crosbie | H04B 7/269 370/338 |
| 2007/0147562 A1* | 6/2007 | Eidson | H04J 3/0667 375/354 |
| 2017/0195109 A1* | 7/2017 | Perez-Cruz | G01S 5/02 |

OTHER PUBLICATIONS

Office Action issued in corresponding CN Application No. 201811387374.8 dated Dec. 16, 2019 (5 pages).

\* cited by examiner

NETWORK APPARATUS AND CLOCK SYNCHRONIZATION METHOD

BACKGROUND

Embodiments disclosed herein relate to the technical field of Internet, in particular to a network apparatus and a clock synchronization method.

With the development of science and technology, the application of Internet has become more and more extensive. The Internet may include a plurality of network apparatuses connected through a network, and the network apparatuses may communicate through the network. In order to ensure normal communication between the network apparatuses, it is generally necessary to ensure synchronization of the system clocks of two or more network apparatuses.

A network apparatus may be provided with a plurality of ports and connected with other network apparatuses serving as clock sources through the ports. The network apparatus can determine a slave port from the plurality of ports through a clock source selection algorithm, and then the system clock of the network apparatus can be synchronized based on the system clock of the clock source connected through the slave port.

However, when the network condition of the slave port fluctuates, the clock offset between the network apparatus and the clock source will also be disturbed, thus causing large deviation when synchronizing the system clock of the network apparatus and low stability and reliability of clock synchronization.

SUMMARY

One or more embodiments disclosed herein provide a network apparatus and a clock synchronization method for synchronizing the system clock of the network apparatus based on a true clock offset, and the stability and reliability of clock synchronization may be improved.

In a first aspect, one or more embodiments of the present invention provide a method for synchronizing a system clock of a network apparatus, the method including:

determining, from a slave port of the network apparatus that is connected to a first clock source, a first clock offset between the system clock and a clock of the first clock source;

determining, from at least one passive port of the network apparatus that connects the network apparatus to at least one second clock source, at least one second clock offset between the system clock and at least one clock of the at least one second clock source;

determining a true clock offset based on the first clock offset and the at least one second clock offset; and synchronizing the system clock using the true clock offset.

In a second aspect, one or more embodiments of the present invention provide a network apparatus connected with a first clock source and at least one second clock source, the network apparatus including:

a system clock; a slave port that is connected to the first clock source; at least one passive port that connects the network apparatus to the at least one second clock source; and a processor that controls synchronization of the system clock, wherein the processor determines, from the slave port, a first clock offset between the system clock and a clock of the first clock source;

wherein the processor determines, from the at least one passive port, at least one second clock offset between the system clock and at least one clock of the at least one second clock source;

wherein the processor determines a true clock offset based on the first clock offset and the at least one second clock offset; and wherein the processor synchronizes the system clock using the true clock offset.

In a third aspect, one or more embodiments of the present invention provide an electronic device which includes a computer readable storage medium storing a computer program and a processor, and when the computer program is read and executed by the processor, the method described in the first aspect above is implemented.

In a fourth aspect, one or more embodiments of the present invention provide a computer readable storage medium on which a computer program is stored, and when the computer program is read and executed by a processor, the method described in the first aspect above is implemented.

In one or more embodiments of the present invention, the first clock offset with respect to the first clock source may be obtained from the slave port and the at least one second clock offset with respect to the at least one second clock source may be respectively obtained from the at least one passive port, so that a true clock offset may be determined based on the first clock offset and the at least one second clock offset. Because the true clock offset is considered accurate, the system clock may be synchronized based on the true clock offset. Thus, large error may be avoided when synchronizing the system clock of network apparatus based on a first clock offset, and the stability and reliability of clock synchronization may be improved.

Other aspects of the disclosure will be apparent from the following description and the appended claims.

DETAILED DESCRIPTION

One or more embodiments of the invention will now be described in detail with reference to the accompanying figures. One having ordinary skill in the art will appreciate that these embodiments and the figures are not intended to limit the scope of the invention and that various other configurations and designs can be devised.

Figure 1:
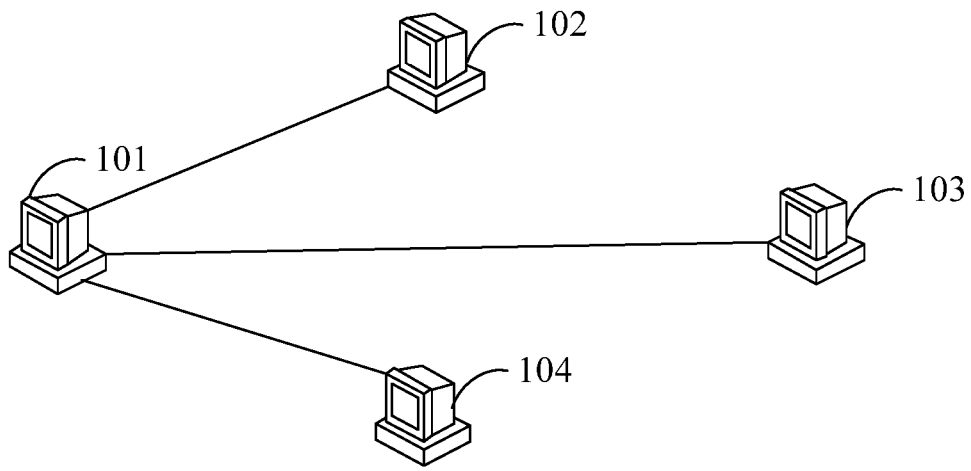
FIG. 1 shows a schematic diagram of an application environment for a network apparatus and a clock synchronization method according to one or more embodiments of the present invention.

FIG. 1 shows a schematic diagram of an application environment for a network apparatus and a clock synchronization method according to one or more embodiments of the present invention. Apparatus 101 may be any network apparatus in a network, and the apparatus 101 is connected to other network apparatuses, such as apparatus 102, apparatus 103, and apparatus 104 shown in FIG. 1, through a plurality of ports, respectively. The above-mentioned apparatuses 101, 102, 103, and 104 support the IEEE (Institute of Electrical and Electronics Engineers) 1588 protocol and may perform clock synchronization based on the IEEE 1588 protocol.

The IEEE 1588 protocol is a standard for precision clock synchronization protocol for networked measurement and control systems, by which the system clock of a network apparatus is synchronized with the system clock of another network apparatus as a clock source through hardware and software.

It should be noted that the system clock is a clock running inside the network apparatus.

It should also be noted that the clock source is another network apparatus based on which the network apparatus performs clock synchronization, and the system clock of the clock source may be used as a reference for the network apparatus to perform clock synchronization.

Taking apparatus 101 for example, apparatus 101 may receive 1588 messages sent from apparatuses 102, 103, and 104 through the respective ports, and the 1588 messages carry respective clock attributes of apparatuses 102, 103, and 104. Apparatus 101 runs a clock source selection algorithm based on the clock attributes of apparatuses 102, 103, and 104, selecting one of the ports as a slave port and the others as passive ports. The network apparatus connected through the slave port is the first clock source (e.g., apparatus 102), and the network apparatuses connected through the passive ports are the second clock sources (e.g., apparatuses 103 and 104). Apparatus 101 may obtain a first clock offset with respect to the first clock source by interacting with the first clock source through the slave port, thereby synchronizing the system clock of apparatus 101 with the system clock of the first clock source based on the first clock offset.

A clock attribute is an attribute possessed by a network apparatus as a clock source. The clock attributes may include at least one of priority and clock precision. Indeed, in practical applications, the clock attributes may also include more or less information.

The first clock offset is a difference of system clock between apparatus 101 and apparatus 102 (i.e., the first clock source).

Take the first clock offset between apparatus 101 and apparatus 102 for example. Apparatus 102 may send to apparatus 101 a clock synchronization message that carries a time stamp (denoted as T1) at which apparatus 102 sends the clock synchronization message. Upon receiving the clock synchronization message, apparatus 101 generates a time stamp of the current time (denoted as T2). Apparatus 101 sends to apparatus 102 a confirmation message for the clock synchronization message, and the confirmation message carries a time stamp (denoted as T3) at which the confirmation message is sent. Upon receiving the confirmation message, apparatus 102 generates and returns a time stamp (denoted as T4) at which the confirmation message is received. The clock synchronization message with these time stamps is returned to apparatus 101, and apparatus 101 determines, based on T1, T2, T3 and T4, that the first clock offset with respect to apparatus 102 is: OFFSET0=[(T2−T1)−(T4−T3)]/2.

However, when the network condition of the slave port fluctuates, the first clock offset determined by apparatus 101 with respect to the first clock source is also disturbed, which may cause the first clock offset to be untrue. If the system clock of apparatus 101 is synchronized based on the first clock offset, a large deviation of the system clock of apparatus 101 may occur. One or more embodiments of the present invention provide a clock synchronization method that may improve the stability and reliability of clock synchronization.

Figure 2:
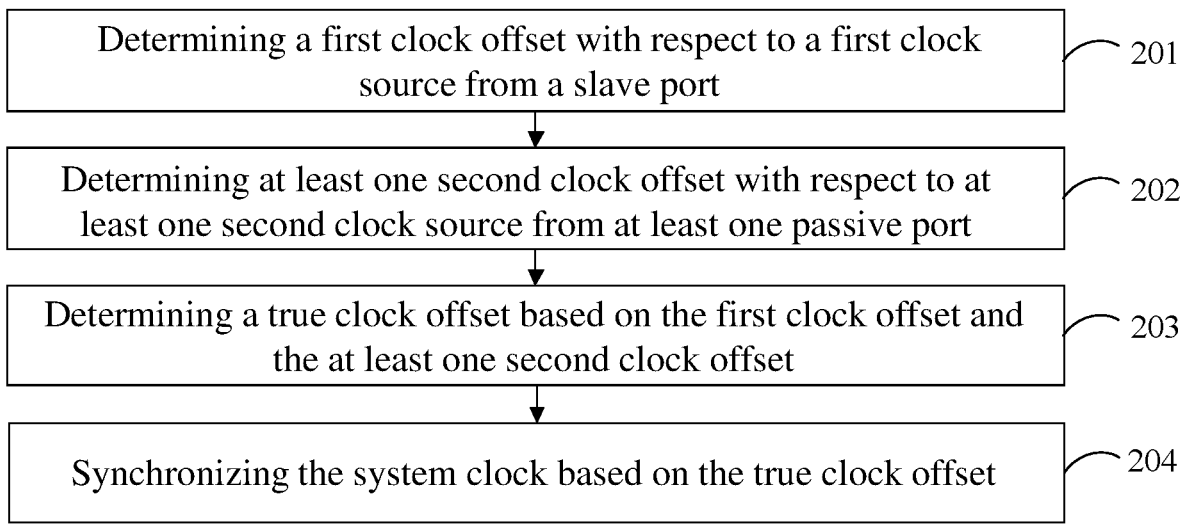
FIG. 2 shows a flowchart of a clock synchronization method according to one or more embodiments of the present invention.

FIG. 2 is a flowchart of a clock synchronization method according to one or more embodiments of the present invention. This method may be applied to the apparatus 101 as shown in FIG. 1. It should be noted that the clock synchronization method according to one or more embodiments of the present invention is not limited to FIG. 2 and the specific sequence described below. It should be understood that in other embodiments, the order of some of steps of the clock synchronization method may be exchanged as needed, or some of the steps may be omitted or deleted. The process as shown in FIG. 2 will be explained in detail below.

In Step 201, a first clock offset with respect to a first clock source is determined from a slave port.

In order to determine a difference between the system clock of the network apparatus and the system clock of the first clock source so as to subsequently synchronize the system clock of the network apparatus, the network apparatus may determine a first clock offset with respect to the first clock source from the slave port.

Regarding the method by which the network apparatus determines the first clock offset with respect to the first clock source, reference is made to the relevant descriptions above, and the details thereof will not be repeated here.

In Step 202, at least one second clock offset with respect to at least one second clock source is determined from at least one passive port.

In order to determine a difference between the system clock of the network apparatus and the system clock of the at least one second clock source so as to subsequently synchronize the system clock of the network apparatus, the network apparatus may determine a second clock offset with respect to the at least one second clock source.

It should be noted that the mothed by which the network apparatus determines the at least one second clock offset with respect to the at least one second clock source may be the same as the method for determining the first clock offset with respect to the first clock source, and the details will not be repeated here.

In Step 203, a true clock offset is determined based on the first clock offset and the at least one second clock offset.

Since the network condition may be unstable, when the network connection between the network apparatus and the first clock source fluctuates, disturbance may occur in the message transmission between the network apparatus and the first clock source, thereby causing a mismatch between the determined first clock offset as described above and the actual difference of system clock between the network apparatus and the first clock source. In other words, the first clock offset may be unreliable. Therefore, in order to avoid synchronizing the system clock of the network apparatus based on a first clock offset with a large error and to improve the stability and reliability of clock synchronization, the network apparatus may determine a true clock offset based on the first clock offset and the at least one second clock offset.

The true clock offset is may be reliable clock offset that the network apparatus may rely on for system clock synchronization of the network apparatus.

The network apparatus may select one of the first clock offset and the at least one second clock offset as the true clock offset according to the preset clock offset selection algorithm. Indeed, the first clock offset and the at least one second clock offset may also be used to recalculate the true clock offset.

It should be noted that the preset clock offset selection algorithm may be determined in advance by the network apparatus, for example, receiving user inputs.

In Step 204, the system clock is synchronized based on the true clock offset.

Since the true clock offset may be accurate, the system clock may be synchronized based on the true clock offset.

The network apparatus may add the true clock offset to the system clock of the network apparatus to synchronize the system clock of the network apparatus.

It should be noted that if the true clock offset cannot be determined through the foregoing steps, the system clock may not be synchronized.

In one or more embodiments of the present invention, the first clock offset with respect to the first clock source may be obtained from the slave port, and the at least one second clock offset with respect to the at least one second clock source may be respectively obtained from the at least one passive port, so that a true clock offset may be determined based on the first clock offset and the at least one second clock offset. Because the true clock offset is accurate, the system clock may be synchronized based on the true clock offset, thus avoiding synchronizing the system clock of network apparatus based on a first clock offset with a larger error and improving the stability and reliability of clock synchronization.

Figure 3:
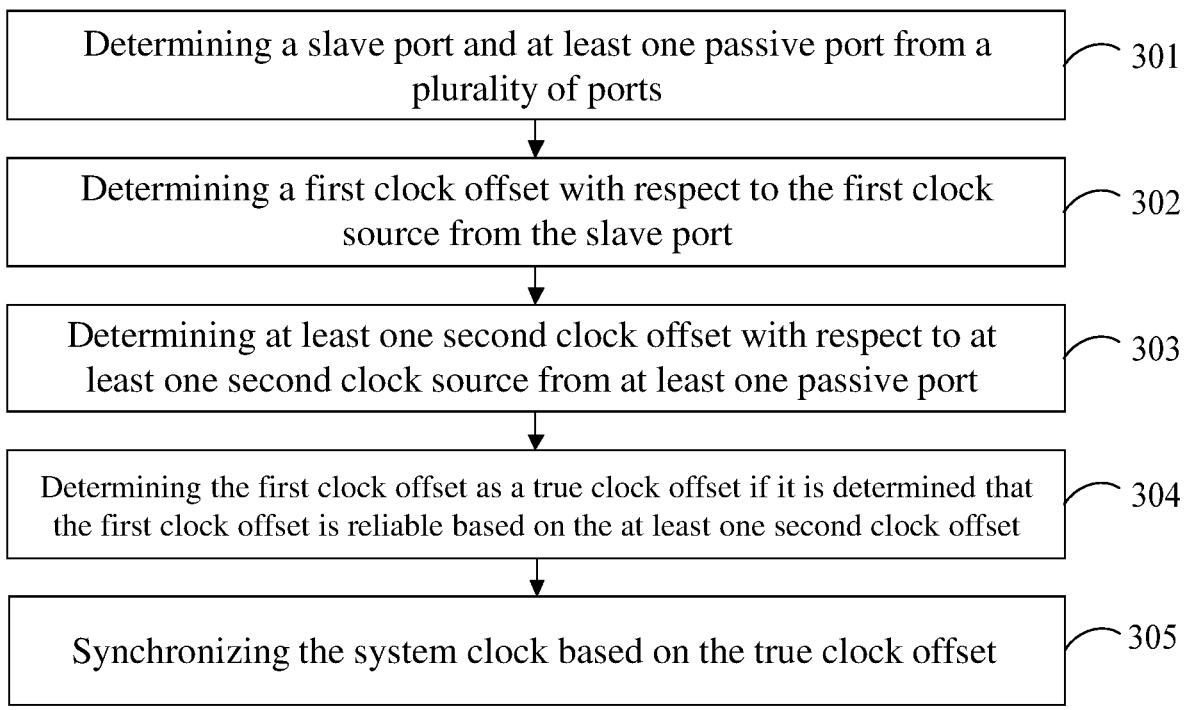
FIG. 3 shows a flowchart of a clock synchronization method according to one or more embodiments of the present invention.

FIG. 3 is a flowchart of a clock synchronization method according to one or more embodiments of the present invention. It should be noted that the clock synchronization method according to one or more embodiments of the present invention is not limited to FIG. 3 and the specific sequence described below. It should be understood that in other embodiments, the order of some of steps of the clock synchronization method may be exchanged as needed, or some of the steps may be omitted or deleted. The process as shown in FIG. 3 will be explained in detail below.

In Step 301, a slave port and at least one passive port are determined from a plurality of ports.

In order to determine a reference network apparatus for clock synchronization, the slave port may be selected from the plurality of ports, and at least one of the remaining ports may serve as the at least one passive port.

Regarding the method by which the network apparatus determines the slave port and the at least on passive port from the plurality of ports, reference is made to the relevant descriptions above, and the details will be not repeated here.

It should be noted that, in practical applications, the slave port and the at least one passive port may also be determined in advance, or only the slave port is determined where there is no slave port or the network apparatus connected to the slave port is malfunctioning. Therefore, the network apparatus may not necessarily perform Step 301 to determine the slave port and the passive port from the plurality of ports each time clock synchronization is performed. In other words, Step 301 may be optional.

In Step 302, the first clock offset with respect to the first clock source is determined from the slave port.

Regarding the method by which the network apparatus determines the first clock offset with respect to the first clock source, reference is made to the relevant descriptions above, and the details thereof will not be repeated here.

In Step 303, at least one second clock offset with respect to the at least one second clock source is determined from the at least one passive port.

Regarding the method by which the network apparatus determines the at least one second clock offset with respect to the at least one second clock source, reference is made to the relevant descriptions above, and the details will not be repeated here.

In Step 304, if it is determined that the first clock offset is reliable based on the at least one second clock offset, the first clock offset is determined as a true clock offset.

Since the first clock offset is determined from the slave port and the slave port is selected from the plurality of ports according to the clock source selection algorithm, the likelihood of the first clock offset to be accurate and reliable is greater than that of the second clock offset to be accurate and reliable. Therefore, in order to improve the accuracy and efficiency of determining the true clock offset and thereby improve the accuracy and efficiency of clock synchronization of the system clock, the clock offsets between the network apparatus and other network apparatuses may be used as a reference for determining whether the first clock offset is reliable, and the first clock offset is determined as the true clock offset when the first clock offset is determined as reliable.

Optionally, an average clock offset of the at least one second clock offset may be calculated, and historic data may be obtained. The historic data may include a plurality of historic values of the first clock offset and a plurality of historic values of the average clock offset. The first clock offset is determined to be reliable if a difference between the first clock offset and a first expectation of the plurality of historic values of the first clock offset is within a first confidence interval and a difference between the average clock offset and the plurality of historic values of the average clock offset is within a second confidence interval.

Since the network condition between the network apparatus and the first clock source or the second clock source should be stable under the condition of ignoring network fluctuations, the first clock offset between the network apparatus and the first clock source and the second clock offset between the network apparatus and the second clock source may conform to Gaussian distributions. Further, since clock synchronization performed for the network apparatus, the first clock source, and the second clock source may ultimately be based on the same reference network apparatus (for example when the first clock source and each of the second clock sources described may perform clock synchronization with another network apparatus as a third clock source), the distribution of the first clock offset between the network apparatus and the first clock source and the distribution of the second clock offset between the network apparatus and the second clock source may also be consistent. Therefore, in order to further improve the accuracy and reliability of determining whether the first clock offset is reliable and thereby improve the accuracy and reliability of clock synchronization, whether the first clock offset is reliable may be determined based on the distributions of the first clock offset and the second clock offset.

Optionally, at least one weight corresponding to the at least one second clock source may be obtained, and a weighted average of the at least one second clock offset is calculated based on the at least one second clock offset and the at least one weight corresponding to the at least one second clock source. The weighted average is determined to be the average clock offset. That is, the average clock offset of the at least one second clock offset may include a weighted average of the at least one second clock offset.

Since each clock source may have different clock attributes, such as clock precision, the reference value of the second clock offsets obtained with respect to different second clock sources may also be different. Therefore, in order to improve the accuracy of the determined average clock offset of the second clock offset and thereby improve the accuracy and reliability of determining whether the first clock offset is reliable, the average clock offset of the second clock offset may include a weighted average of at least one second clock offset.

For example, the second clock source may include a clock source 1 and a clock source 2. The second clock offset determined from clock source 1 is OFFSET1, and clock source 1 corresponds to a weight of 0.6. The second clock offset determined from clock source 2 is OFFSET2, and clock source 2 corresponds to a weight of 0.4. The average clock offset of the second clock offset is OFFSETN=OFFSET1*0.6+OFFSET2*0.4, where OFFSETN represents the average clock offset of the second clock offset.

It should be noted that the at least one weight corresponding to the at least one second clock source may be set in advance by, for example, receiving a weight specified by the user for each second clock source. Indeed, in practical applications, the at least one weight may be determined by other methods. For example, the weight corresponding to each second clock source is determined based on the clock attributes of the second clock source.

Indeed, in practical applications, the average clock offset of the at least one second clock offset may also include an arithmetic mean of the at least one second clock offset.

It should also be noted that the historic data may be obtained at a time before the current time, including obtaining the first clock offset from the slave port as the historic first clock offset, obtaining the second clock offset from the at least one passive port, and determining the average of the at least one of the second clock offset to be the historic average clock offset.

It should be noted that the first preset confidence interval or the second preset confidence interval may be determined in advance. For example, a value range inputted by the user may be set as the first preset confidence interval or the second preset confidence interval.

A first expectation and a first variance of the plurality of historic values of the first clock offset may be determined based on the plurality of historic values of the first clock offset such that a Gaussian distribution of the plurality of historic values of the first clock offset may be determined based on the determined first expectation and first variance. Likewise, a second expectation and a second variance of the plurality of historic values of the average clock offset may be determined based on the plurality of historic values of the average clock offset such that a Gaussian distribution of the plurality of historic values of the average clock offset may be determined based on the determined second expectation and second variance.

Optionally, the first preset confidence interval is $[-3\sigma_1, 3\sigma_1]$ and the second preset confidence interval is $[-3\sigma_2, 3\sigma_2]$, where $\sigma_1$ is a standard deviation of the plurality of historic values of the first clock offset and $\sigma_2$ is a standard deviation of the plurality of historic values of the at least one second clock offset.

In a Gaussian distribution, the probability that a value is within $(\mu-3\sigma, \mu+3\sigma)$ is 0.9973, where $\mu$ is a mathematical expectation. When the value is not within $(\mu-3\sigma, \mu+3\sigma)$, the value may contain a gross error instead of a random error. Therefore, the first preset confidence intervals may be set to be $[-3\sigma_1, 3\sigma_1]$, and the second preset confidence interval may be set to be $[-3\sigma_2, 3\sigma_2]$.

It should be noted that, in order to improve the accuracy of clock synchronization of the network apparatus as much as possible, the first preset confidence interval may also be $[-2\sigma_1, 2\sigma_1]$, and correspondingly, the second preset confidence interval may be $[-2\sigma_2, 2\sigma_2]$. Alternatively, the first preset confidence interval may also be $[-\sigma_1, \sigma_1]$, and correspondingly, the second preset confidence interval may be $[-\sigma_2, \sigma_2]$. Indeed, in practical applications, the first preset confidence interval and the second preset confidence interval may also be other ranges.

Further, in practical applications, the network apparatus may also determine, by other methods, whether the first clock offset is reliable based on the at least one second clock offset. For example, the first clock offset and the at least one second clock offset may be input to a pre-trained machine learning model, and whether the first clock offset is reliable is determined by using the machine learning model. Regarding the method by which the network apparatus determines whether the first clock offset is reliable based on the at least one second clock offset, reference may be made to subsequent relevant descriptions, and no details will be repeated here.

It should be noted that, if the first clock offset is to be determined by the pre-trained machine learning model, training samples may be obtained in advance. The training samples may include multiple sets of a sample first clock offset and at least one sample second clock offset, and each set is marked according to whether its sample first clock offset is reliable. Based on the training samples, the machine learning model is trained to determine whether the first clock offset is reliable based on the at least one second clock offset.

It should be noted that the more the number of the second clock offset is, the wider the reference range with respect to the first clock offset is. Consequently, whether the first clock offset is reliable may be determined with better accuracy, and the stability and reliability of clock synchronization may be more effectively improved.

Optionally, if the difference between the first clock offset and the first expectation is not within the first preset confidence interval and the difference between the average clock offset and the second expectation is within the second preset confidence interval, it is determined that the first clock offset is not reliable. In this case, the first clock offset is discarded, and the average clock offset is stored to the historic data.

When the difference between the first clock offset and the first expectation is not within the first preset confidence interval and the difference between the average clock offset and the second expectation is within the second preset confidence interval, the network condition between the network apparatus and the first clock source may have suffered a major fluctuation while the network condition between the network apparatus and the second clock source is stable. Therefore, the first clock offset is not reliable. However, since the difference between the average clock offset and the second expectation is within the second preset confidence interval, the first clock offset may be discarded, and the average clock offset is stored as part of the historic data.

It should be noted that when it is determined that the first clock offset is not reliable, the system clock of the network apparatus may not be synchronized.

Optionally, if the difference between the first clock offset and the first expectation is not within the first preset confidence interval, the difference between the average clock offset and the second expectation is not within the second preset confidence interval, and the magnitude relationship between the first clock offset and the first expectation and the magnitude relationship between the average clock offset and the second expectation are the same, then it is determined that the first clock offset is unreliable. In this case, the first clock offset and the average clock offset are stored to the historic data.

When the difference between the first clock offset and the first expectation is not within the first preset confidence interval, the difference between the average clock offset and the second expectation is not within the second preset confidence interval, and the magnitude relationship between the first clock offset and the first expectation and the magnitude relationship between the average clock offset and the second expectation are the same (that is, the system clock of the network apparatus is offset in the same direction relative to the first clock source and the second clock source), it is possible that the network condition of the same ultimate reference network apparatus based on which the network apparatus, the first clock source, and the second clock source perform clock synchronization has suffered a fluctuation. Therefore, although the first clock offset is not reliable, the first clock offset and the average clock offset may be stored to the historic data.

If the difference between the first clock offset and the first expectation and the difference between the average clock offset and the second expectation are both positive values or negative values, it is determined that the magnitude relationship between the first clock offset and the first expectation and the magnitude relationship between the average clock offset and the second expectation are the same; otherwise, it is determined the magnitude relationship between the first clock offset and the first expectation and the magnitude relationship between the average clock offset and the second expectations are different.

Optionally, if the difference between the first clock offset and the first expectation is not within the first preset confidence interval, the difference between the average clock offset and the second expectation is not within the second preset confidence interval, and the magnitude relationship between the first clock offset and the first expectation and the magnitude relationship between the average clock offset and the second expectation are different, then it is determined that the first clock offset is unreliable. In this case, the first clock offset and the average clock offset are discarded.

When the difference between the first clock offset and the first expectation is not within the first preset confidence interval, the difference between the average clock offset and the second expectation is not within the second preset confidence interval, and the magnitude relationship between the first clock offset and the first expectation and the magnitude relationship between the average clock offset and the second expectation are different, it may be determined that major fluctuations occurred both between the network apparatus and the first clock source and between the network apparatus and the second clock source. Therefore, the first clock offset and the average clock offset may be discarded.

In Step 305, the system clock is synchronized based on the true clock offset.

For the method of synchronizing the system clock based on the true clock offset, reference is made to the relevant descriptions above, and the details will not be repeated here.

In one or more embodiments of the present invention, the first clock offset with respect to the first clock source may be determined from the slave port and the second clock offset with respect to the at least one second clock source may be respectively determined from the at least one passive port, so that it is possible to determine whether the first clock offset is reliable by using the second clock offset of the at least one second clock source as a reference. Then, the system clock is synchronized with the clock of the first clock source when it is determined that the first clock offset is reliable. This avoids synchronizing the system clock of the network apparatus based on a first clock offset with a large error, thereby improving the stability and reliability of clock synchronization.

Furthermore, according to one or more embodiments of the present invention, it is possible to determine an average clock offset of the at least one second clock offset and obtain historic data including a plurality of historic values of the first clock offset and a plurality of historic values of the average clock offset. It is possible to determine whether the first clock offset is reliable based on the distributions of the plurality of historic values of the first clock offset and the plurality of historic values of the average clock offset. Specifically, it is determine that the first clock offset is reliable when a difference between the first clock offset and a first expectation of the plurality of historic values of the first clock offset is within a first preset confidence interval and the difference between the average clock offset and a second expectation of the plurality of historic values of the average clock offset is within a second preset confidence interval, it is determined that the first clock offset is reliable. This further improves the accuracy and reliability of determining whether the first clock offset is reliable, thereby improving the accuracy and reliability of clock synchronization.

Figure 4:
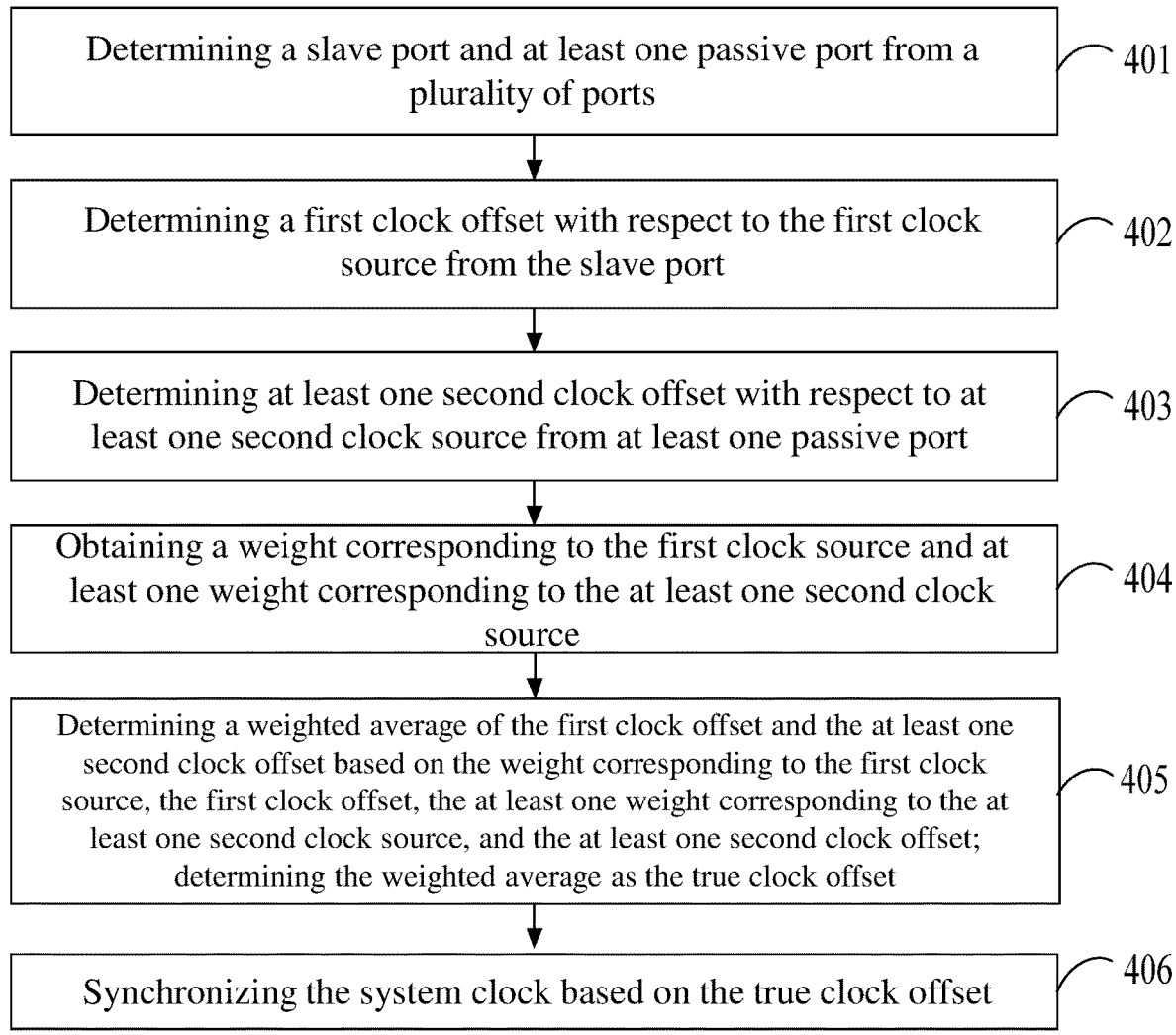
FIG. 4 shows a flowchart of a clock synchronization method according to one or more embodiments of the present invention.

FIG. 4 is a flowchart of a clock synchronization method according to one or more embodiments of the present invention. It should be noted that the clock synchronization method according to one or more embodiments of the present invention is not limited to FIG. 4 and the specific sequence described below. It should be understood that in other embodiments, the order of some of steps of the clock synchronization method may be exchanged as needed, or some of the steps may be omitted or deleted. The process as shown in FIG. 4 will be explained in detail below.

In Step 401, a slave port and at least one passive port are determined from a plurality of ports.

Regarding the method by which the network apparatus determines the slave port and the at least on passive port from the plurality of ports, reference is made to the relevant descriptions above, and the details will be not repeated here.

It should be noted that, in one or more embodiments of the present invention, Step 401 is optional.

In Step 402, the first clock offset with respect to the first clock source is determined from the slave port.

Regarding the method by which the network apparatus determines the first clock offset with respect to the first clock source, reference is made to the relevant descriptions above, and the details thereof will not be repeated here.

In Step 403, at least one second clock offset with respect to the at least one second clock source is determined from the at least one passive port.

For the method of obtaining the second clock offset with respect to the at least one second clock source based on the at least one passive port, reference is made to the relevant descriptions above, and the details will not be repeated here.

In Step 404, a weight corresponding to the first clock source and at least one weight corresponding to the at least one second clock source are obtained.

Since the possibility of the first clock source and the at least one second clock source being affected by network fluctuation simultaneously, and the clock attributes of the first clock source and the at least one second clock source are different, such as clock precision, the accuracy of the first clock offset and the accuracy of each of the second clock offsets are also different. Therefore, in order to facilitate the subsequent use of the first clock offset and the second clock offsets with different accuracy for reference and thus determine a true clock offset with stability, thereby improving the stability of the synchronization of the system clock, a weight corresponding to the first clock source and at least one weight corresponding to the at least one second clock source may be obtained.

The method of obtaining the weight corresponding to the first clock source may be the same as that of obtaining the at least one weight corresponding to the at least one second clock source. For the method of obtaining the at least one weight corresponding to the at least one second clock source, reference is made to the relevant description above, and the details will not be repeated here.

In Step 405, a weighted average of the first clock offset and the at least one second clock offset is determined based on the weight corresponding to the first clock source, the first clock offset, the at least one weight corresponding to the at least one second clock source, and the at least one second clock offset. The weighted average is determined to be the true clock offset.

The weighted average of the first clock offset and the at least one second clock offset may be obtained by adding a product of the weight of the first clock source and the first clock offset and a product of each of the at least one second clock offset and the weight corresponding to the at least one second clock source.

For example, the first clock source may include a clock source 3. The first clock offset determined with respect to clock source 3 is OFFSET0 and the first clock source corresponds to a weight of 0.6. The second clock source may include a clock source 1 and a clock source 2. The second clock offset obtained with respect to clock source 1 is OFFSET1, and the weight corresponding to clock source 1 is 0.2. The second clock offset obtained with respect to clock source 2 is OFFSET2, and the weight corresponding to clock source 2 is 0.2. Thus, the true clock offset is OFFSETP=OFFSET0*0.6+OFFSET1*0.2+OFFSET2*0.2, where OFFSETP represents the true clock difference.

In Step 406, the system clock is synchronized based on the true clock offset.

For the method of synchronizing the system clock based on the true clock offset, reference is made to the relevant descriptions above, and the details will not be repeated here.

In one or more embodiments of the present invention, a first clock offset with respect to the first clock source may be determined from the slave port, at least one second clock offset with respect to the at least one second clock source may be obtained from the at least one passive port, and a weight corresponding to the first clock source and a weight corresponding to the at least one second clock source may be obtained, such that a weighted average of the first clock offset and the at least one second clock offset is determined to be the true clock offset. Therefore, a true clock offset with stable reliability may be obtained on a sufficient basis of the first clock offset and the at least one second clock offset with different accuracy. It is possible to ensure that the true clock offset may be calculated each time clock synchronization is performed, thereby improving the stability of the true clock offset. As such, the system clock of the network apparatus is synchronized based on the true clock offset, which avoids synchronizing the system clock of the network apparatus based on a first clock offset with a large error, thereby improving the stability and reliability of clock synchronization.

Figure 5:
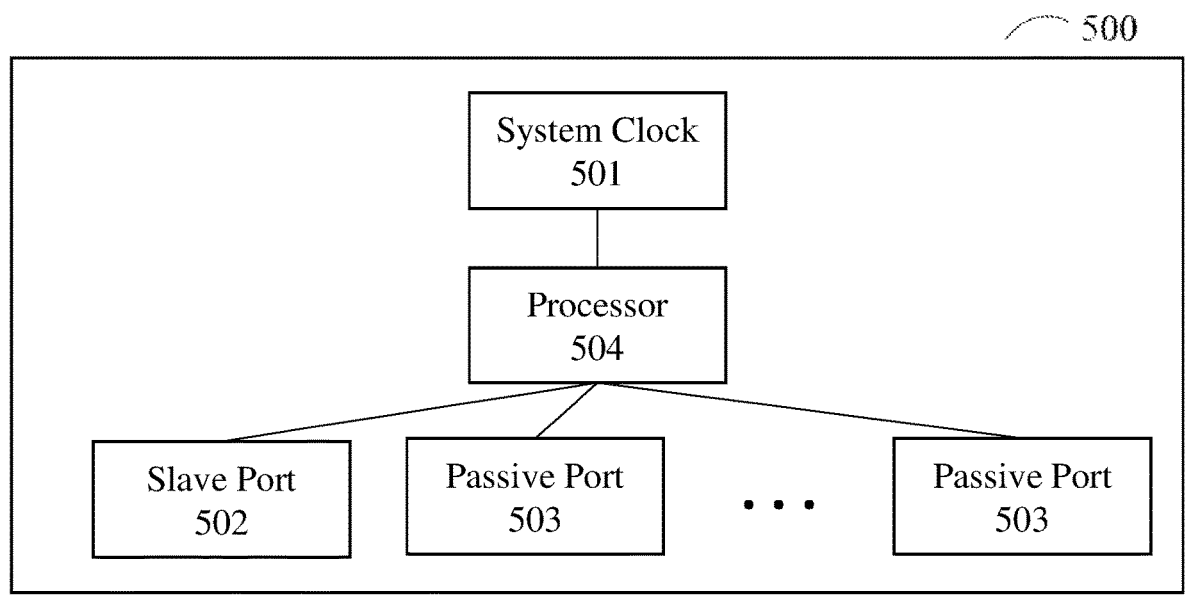
FIG. 5 shows a schematic diagram of a configuration of a network apparatus according to one or more embodiments of the present invention.

FIG. 5 shows a schematic diagram of a configuration of a network apparatus 500 according to one or more embodiments of the present invention. It should be noted that the network apparatus 500 according to one or more embodiments of the present invention is configured to perform the clock synchronization method according to one or more embodiments of the present invention described above. The network apparatus 500 is connected with a first clock source and at least one second clock source, the network apparatus 500 including:

a system clock 501; a slave port 502 that is connected to the first clock source (not shown); at least one passive port 503 that connects the network apparatus 500 to the at least one second clock source (not shown); and a processor 504 that controls synchronization of the system clock 501. The processor 504 determines, from the slave port 502, a first clock offset between the system clock 501 and a clock of the first clock source.

The processor 504 also determines, from the at least one passive port 503, at least one second clock offset between the system clock 501 and at least one clock of the at least one second clock source.

Then, the processor 504 determines a true clock offset based on the first clock offset and the at least one second clock offset.

Further, the processor 504 synchronizes the system clock 501 using the true clock offset.

In one or more embodiments, in response to the processor 504 determining that the first clock offset is reliable based on the at least one second clock offset, the true clock offset is equal to the first clock offset.

In one or more embodiments, the processor 504 calculates an average of the at least one second clock offset. Further, the processor 504 obtains historic data including a plurality of historic values of the first clock offset and a plurality of historic values of the average of the at least one second clock offset. Then, the processor 504 determines that the first clock offset is reliable when a difference between the first clock offset and a first expectation of the plurality of historic values of the first clock offset is within a first confidence interval, and a difference between the average and the plurality of historic values of the average is within a second confidence interval.

In one or more embodiments, the processor 504 obtains at least one weight corresponding to the at least one second clock source, calculates a weighted average of the at least one second clock offset, and determines the weighted average to be the average clock offset.

Optionally, the first preset confidence interval is $(-3\sigma_1, 3\sigma_1)$ and the second preset confidence interval is $(-3\sigma_2, 3\sigma_2)$, where $\sigma_1$ is a standard deviation of the plurality of historic values of the first clock offset and $\sigma_2$ is a standard deviation of the plurality of historic values of the at least one second clock offset.

In one or more embodiments, the processor 504 obtains a weight corresponding to the first clock source and at least one weight corresponding to the at least one second clock source. The processor 504 further determines a weighted average of the first clock offset and the at least one second clock offset based on the weight corresponding to the first clock source, the first clock offset, the at least one weight corresponding to the at least one second clock source, and the at least one second clock offset. Then, the processor 504 determines the weighted average to be the true clock offset.

Optionally, if the difference between the first clock offset and the first expectation is not within the first preset confidence interval and the difference between the average clock offset and the second expectation is within the second preset confidence interval, the processor 504 determines that the first clock offset is not reliable. In this case, the processor 504 discards the first clock offset is discarded and stores the average clock offset to the historic data in a memory (not shown).

If the difference between the first clock offset and the first expectation is not within the first preset confidence interval, the difference between the average clock offset and the second expectation is not within the second preset confidence interval, and the magnitude relationship between the first clock offset and the first expectation and the magnitude relationship between the average clock offset and the second expectation are the same, then the processor 504 determines that the first clock offset is unreliable. In this case, the processor 504 stores the first clock offset and the average clock offset to the historic data in the memory.

If the difference between the first clock offset and the first expectation is not within the first preset confidence interval, the difference between the average clock offset and the second expectation is not within the second preset confidence interval, and the magnitude relationship between the first clock offset and the first expectation and the magnitude relationship between the average clock offset and the second expectation are different, then the processor 504 determines that the first clock offset is unreliable. In this case, the processor 504 discards the first clock offset and the average clock offset.

In one or more embodiments of the present invention, the processor 504 may be implemented as one or more integrated circuits, such as one or more application specific integrated circuits (ASICs), one or more microprocessors (digital signal processors, DSP), one or more field programmable gate arrays (Field Programmable Gates Array, FPGA), or the like that realizes one or more of the various functions performed by the processor 504 as described above. In another embodiment, when one or more of the above various functions are implemented by a processing component executing program codes, the processing component may be a general-purpose processor, such as a central processing unit (CPU) or any other processor that can invoke the program codes. In yet another embodiment, components that realize the various functions described above may be integrated and implemented in the form of a system-on-a-chip (SOC).

Figure 6:
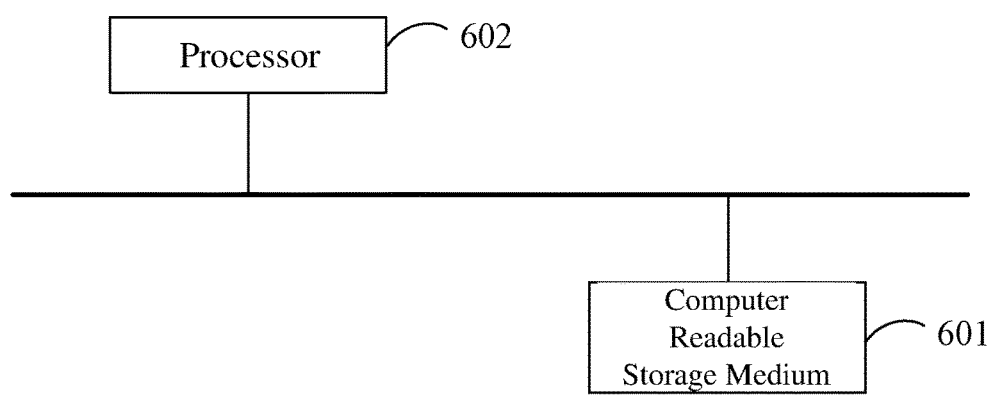
FIG. 6 shows a schematic diagram of a configuration of an electronic device according to one or more embodiments of the present invention.

FIG. 6 shows a schematic diagram of a configuration of an electronic device according to one or more embodiments of the present invention. The electronic device may include a computer readable storage medium 601 storing a computer program and a processor 602 that can invoke the computer program stored on the computer readable storage medium 601. When the computer program is read and executed by the processor 602, the above-described method can be implemented.

In one or more embodiments of the present invention, provided is a computer readable storage medium having stored thereon a computer program that can be read and executed by a processor to implement the above-described method.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network apparatus connected with a first clock source and at least one second clock source, the network apparatus comprising:
    a system clock;
    a slave port that is connected to the first clock source;
    at least one passive port that connects the network apparatus to the at least one second clock source; and
    a processor that controls synchronization of the system clock,
    wherein the processor determines, from the slave port, a first clock offset between the system clock and a clock of the first clock source;
    wherein the processor determines, from the at least one passive port, at least one second clock offset between the system clock and at least one clock of the at least one second clock source;
    wherein the processor determines a true clock offset based on the first clock offset and the at least one second clock offset;
    wherein the processor synchronizes the system clock using the true clock offset, and
    wherein in response to the processor determining that the first clock offset is reliable based on the at least one second clock offset, the true clock offset is equal to the first clock offset.

2. The network apparatus according to claim 1, wherein, to determine the second clock offset,
    the passive port receives from the second clock source a first message at a first time stamp T1, the first message indicating a second time stamp T2 at which the second clock source sends the first message;
    after receiving the first message, the passive port sends to the second clock source a second message at a third time stamp T3;
    after receiving the second message, the second clock source sends to the passive port a third message, the third message indicating a fourth time stamp T4 at which the second clock source receives the second message; and
    the second clock offset is determined as [(T2−T1)−(T4−T3)]/2.

3. The network apparatus according to claim 1,
    wherein the processor calculates an average of the at least one second clock offset;
    wherein the processor obtains historic data, the historic data comprising: a plurality of historic values of the first clock offset, and a plurality of historic values of the average of the at least one second clock offset; and
    wherein the processor determines that the first clock offset is reliable when:
        a difference between the first clock offset and a first expectation of the plurality of historic values of the first clock offset is within a first confidence interval, and a difference between the average and the plurality of historic values of the average is within a second confidence interval.

4. The network apparatus according to claim 3, wherein the average is a weighted average.

5. The network apparatus according to claim 3, wherein the first confidence interval is $(-3\sigma_1, 3\sigma_1)$ and the second confidence interval is $(-3\sigma_2, 3\sigma_2)$, where $\sigma_1$ is a standard deviation of the plurality of historic values of the first clock offset, and $\sigma_2$ is a standard deviation of the plurality of historic values of the at least one second clock offset.

6. The network apparatus according to claim 1,
wherein the processor processes the first clock offset and the at least one second clock offset using a machine learning model that is trained using a plurality of samples, each of the plurality of samples comprising a sample first clock offset and at least one sample second clock offset;
wherein each of the plurality of samples is marked reliable or unreliable according to its sample first clock offset and its at least one sample second clock offset; and
wherein the processor determines whether the first clock offset is reliable using the machine learning model.

7. The network apparatus according to claim 1, wherein the true clock offset is a weighted average of the first clock offset and the at least one second clock offset.

8. The network apparatus according to claim 1, wherein the slave port is selected from a plurality of ports using a clock source selection algorithm.

9. A method for synchronizing a system clock of a network apparatus, comprising:
determining, from a slave port of the network apparatus that is connected to a first clock source, a first clock offset between the system clock and a clock of the first clock source;
determining, from at least one passive port of the network apparatus that connects the network apparatus to at least one second clock source, at least one second clock offset between the system clock and at least one clock of the at least one second clock source;
determining a true clock offset based on the first clock offset and the at least one second clock offset; and
synchronizing the system clock using the true clock offset,
wherein in response to the first clock offset being determined to be reliable based on the at least one second clock offset, the true clock offset is equal to the first clock offset.

10. The method according to claim 9, wherein determining the second clock offset comprises:
receiving, by the passive port and from the second clock source, a first message at a first time stamp T1, the first message indicating a second time stamp T2 at which the second clock source sends the first message;
after receiving the first message, sending, by the passive port and to the second clock source, a second message at a third time stamp T3;
receiving, by the passive port, a third message,
wherein the third message is sent by the second clock source after the second clock source receives the second message, and
wherein the third message indicates a fourth time stamp T4 at which the second clock source receives the second message; and
calculating the second clock offset as $[(T2-T1)-(T4-T3)]/2$.

11. The method according to claim 9, further comprising:
calculating an average of the at least one second clock offset; and
obtaining historic data, the historic data comprising: a plurality of historic values of the first clock offset, and a plurality of historic values of the average of the at least one second clock offset,
wherein the first clock offset is determined to be reliable when:
a difference between the first clock offset and a first expectation of the plurality of historic values of the first clock offset is within a first confidence interval, and
a difference between the average and the plurality of historic values of the average is within a second confidence interval.

12. The method according to claim 11, wherein the average is a weighted average.

13. The method according to claim 11, wherein the first confidence interval is $(-3\sigma_1, 3\sigma_1)$ and the second confidence interval is $(-3\sigma_2, 3\sigma_2)$, where $\sigma_1$ is a standard deviation of the plurality of historic values of the first clock offset, and $\sigma_2$ is a standard deviation of the plurality of historic values of the at least one second clock offset.

14. The method according to claim 9, further comprising:
processing the first clock offset and the at least one second clock offset using a machine learning model that is trained using a plurality of samples, each of the plurality of samples comprising a sample first clock offset and at least one sample second clock offset, wherein each of the plurality of samples is marked reliable or unreliable according to its sample first clock offset and its at least one sample second clock offset; and
determining whether the first clock offset is reliable using the machine learning model.

15. The method according to claim 9, wherein the true clock offset is a weighted average of the first clock offset and the at least one second clock offset.

16. The method according to claim 9, wherein the slave port is selected from a plurality of ports using a clock source selection algorithm.

* * * * *